United States Patent [19]

Geller et al.

[11] Patent Number: 4,493,114
[45] Date of Patent: Jan. 8, 1985

[54] OPTICAL NON-LINE-OF-SIGHT COVERT, SECURE HIGH DATA COMMUNICATION SYSTEM

[75] Inventors: Myer Geller, San Diego; Thomas E. Keenan, La Mesa; Daniel E. Altman, San Diego; Richard H. Patterson, Vista, all of Calif.

[73] Assignee: The United States of America as represented by the Secretary of the Navy, Washington, D.C.

[21] Appl. No.: 490,695

[22] Filed: May 2, 1983

[51] Int. Cl.³ .............................................. H04B 9/00
[52] U.S. Cl. .................................. 455/617; 250/372; 455/608
[58] Field of Search ............... 455/606, 607, 608, 617, 455/618, 619; 250/372

[56] References Cited

U.S. PATENT DOCUMENTS

| | | | |
|---|---|---|---|
| 2,562,887 | 8/1951 | Beese | 250/211 R |
| 2,858,421 | 10/1958 | Touvet | 250/207 |
| 3,011,058 | 11/1961 | Becker | 250/347 |
| 3,129,332 | 4/1964 | Leen | 250/372 |
| 3,443,095 | 5/1969 | Frungel | 250/372 |
| 3,444,544 | 5/1969 | Pearson | 340/506 |
| 3,636,356 | 1/1972 | Giordmaine | 307/425 |
| 3,657,543 | 4/1972 | Rose | 329/144 |
| 3,900,404 | 8/1975 | Dachs | 250/199 |
| 4,079,246 | 3/1978 | Misek | 455/617 |
| 4,196,257 | 4/1980 | Engstrom et al. | 313/542 |
| 4,383,200 | 5/1983 | Van Zon et al. | 315/112 |

*Primary Examiner*—Joseph A. Orsino, Jr.
*Assistant Examiner*—Timothy K. Greer
*Attorney, Agent, or Firm*—Robert F. Beers; Ervin F. Johnston; Thomas Glenn Keough

[57] ABSTRACT

An omnidirectional non-line-of-sight communication capability is assured by transmission and reception in the "solar blind" ultraviolet spectrum. An omnidirectional ultraviolet source generates a UV carrier in the tens of watts power range. This is modulated and received by having a sensitivity to respond to scattered UV modulated energy. Pulse modulating the ultraviolet spectrum signal and providing appropriate logic circuitry associated with the wide field-of-view receiver reduces the values of bit error rate.

13 Claims, 6 Drawing Figures

OPTICAL NON-LINE-OF-SIGHT COVERT, SECURE HIGH DATA COMMUNICATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Highly reliable, short range communications are a vital necessity for a host of closely coordinated activities that involve high performance equipments and precision technologies as well as those situations that usually call for split second timing. The military is one user where all these factors are acutely present.

The military also requires covertness, security and nonsusceptibility to being jammed. Since centralized command posts are targets for hostile action and the reliable communication links are a vulnerable component of command, control, and cummunication networks, higher reliability communications are vitally needed. Many times, communication silence is imposed, since otherwise, a hostile force can readily locate friendly locations by directionally homing in on a transmitter. In this regard, active sensors such as radar, although excellent in the surveillance problem, are directionally detectable like a conventional radio transmitter; while passive sensors are less vulnerable, they do not provide accurate information unless they are internetted with a high bandwidth communication network.

Short wavelength signals, in the millimeter range, have proven quite acceptable for line-of-sight communications for they tend to deny the information to a hostile monitoring station; yet, their usefulness is limited, particularly in hilly terrain. Still shorter wave lengths within the optical and infrared regions rely on lasers which offer very tight, highly collimated beams. Receivers with a narrow field-of-view limit the noise from daylight and other background radiation sources so that reliability is quite acceptable; however, once more, elaborate pointing and aiming efforts are required for the receivers and transmitters to pass the beams and uneven terrain limits their usefulness.

One hitherto unexploited spectrum for communications lie in the optical spectrum and is identified as the "solar blind" region This is a specific spectral region from 230 to 280 nanometers in which the ozone layer surrounding the earth absorbs the sun's radiation and, hence the expression "solar blind". A detector that is only sensitive to this spectral region has the capability to operate in the daylight, even while pointing at the sun, and pick up little background radiation because the UV spectrum from 230 to 280 nanometers is absorbed by the ozone layer. Thus, a detector operating in this wavelength region need not be directional and will have an increased performance by orders of magnitude because of the reduction of the background noise. Furthermore, precise alignment of the transmitter and receiver is dispensed with since a detector does not have to operate in the line-of-sight but can function in a wide field-of-view mode to sense radiation scattered by the modulated UV signal.

A wide field-of-view receiver could be assembled that has a detector that is sensitive to the scattered radiation from a transmitter to increase the receiver signal's strength. Calculations using a single scatter model of radiation from atmospheric aerosols show that the ultraviolet solar blind detector can be out of the direct path of the transmitted beam, and when exposed to the scattered beam, it picks up sufficient radiation for system operation. This provides a non-line-of-sight operational capability. The calculation shows that as the divergence of the transmitter beam is increased, performance degrades somewhat but not too seriously. Thus, an incoherent source that is only somewhat directional will suitably function as a transmitter; since such a source can be employed, a bid advantage is apparent as almost all lasers and certainly all ultraviolet lasers are inefficient and do not emit watts of average power. On the other hand, an incoherent UV source emits average power of watts efficiently with uncomplicated technology. There are no ultraviolet lasers that can compete in this regard.

It might be expected that UV lasers could be adapted to a UV communication system. At first glance, a laser operating in the "solar blind" region could zero in on a line-of-sight or in a scattering mode of transmission. But, when the power inefficiencies and relatively delicate and bulky structures of the UV lasers are considered, they are generally unsuitable for use in the field. For example, a pulsed xenon lamp has efficiencies of conversion of electrical power into usuable ultraviolet radiation of about 0.2% with average output powers less than 0.1 watt. Such a low power projection must necessarily be accurately aligned to a field-of-view receiver and has a greatly limited usable range. When pulse modulation was tried, the xenon lamp could only be modulated at lower frequencies.

Thus, there is a continuing need in the state-of-the-art for a secure and covert communications system operating in the "solar blind" ultraviolet spectrum having a transmitted power of multi-watts to assure reliable non-line-of-sight communications.

DESCRIPTION OF THE PREFERRED EMBODIMENTS

Figure 1:
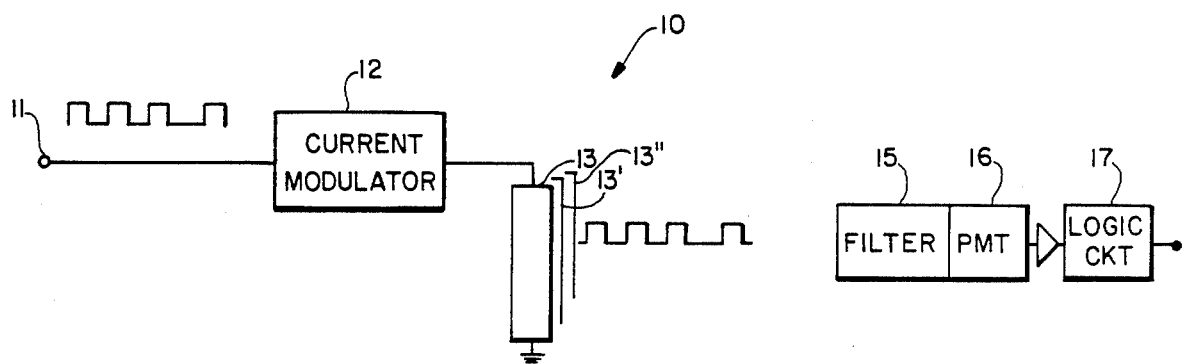
FIG. 1 depicts a schematic representation of the principal elements of the invention.

Referring now to the drawings, FIG. 1 shows the critical elements of an ultraviolet communication system 10. A binary data source 11 provides a series of bits and zeroes or on and off pulses which are representative of some information for transmission. The binary data could be the output of an analog-to-digital converter that receives voice signals or could be the outut of a computer. In any case, the binary data is fed to a current modulator 12 that provides a responsive on/off actuation sequence for an interconnected ultraviolet source 13.

The current modulator is no more than a conventional on/off keying circuit that receives binary data and switches its output terminal in a responsive signal of on and off pulses. Such circuitry is well established in the art and further elaboration is dispensed with. Receiving a binary 1 would cause the modulator to turn on; receiving a binary zero would cause the modulator to turn off so that the interconnected ultraviolet source is responsively switched on and off.

The ultraviolet source, typically, is a mercury argon discharge lamp such as that commercially manufactured by the General Electric Company and marketed as one of several models of a germicidal lamp. This lamp coupled to a conventional AC power supply produces 257 nanometer radiation precisely to function as an ultraviolet carrier frequency.

This signal is modulated in a series of on/off pulses by the current modulator in a frequency range as high as 100 kilohertz. The one inch diameter of the mercury discharge lamp provides a five watt output with 25 watts electrical power input.

The memory argon discharge lamps are incoherent sources and are very effective in the transmitter role. If a greater transmitting power is needed, two, three, four, or more lamps 13', 13'', etc. can be placed side-by-side with the consequent algabraic increase in the radiated power. The mercury argon discharge lamps are very efficient converters of electrical energy into ultraviolet energy within the "solar blind" region and lend themselves very well to being modulated by an input current from a wide variety of current modulators.

Since the power available at the transmitter is a multiple of the mercury argon lamps, radiated power in the tens of watts range is realistically and economically projected. The relatively huge quantum of modulated ultraviolet radiation passes through the communication channel omnidirectionally from the transmitter and is scattered by atmospheric aerosols and molecules. Line-of-sight positioning of a receiver within a predetermined range, is not critical.

A wide field-of-view filter 15 is located within the range of the ultraviolet source and can be positioned behind hills, trees, or other obstacles. The filter allows the passage of 237 nanometer ultraviolet energy that is scattered by molecules and aerosols in the atmosphere. One filter that has performed satisfactorily is the solar blind filter SB 300 marketed by Corion. This has a 70% transmissivity in the "solar blind" region, particularly at 253.7 nanometers.

A photomultiplier tube 16 is provided that has a spectral sensitivity to the 253.7 nanometer ultraviolet radiation to provide representative output pulses. A typical photomultiplier tube is a model 541 Q-05M by EMR Photoelectric Company of Princeton, N.J. It operates in the "solar blind region and is sensitive to the 257 nanometer radiation coming from ultraviolet source 13. An interconnected logic circuitry 17 discerns when valid data is received and further screens out the effects of background radiation.

Figure 4:
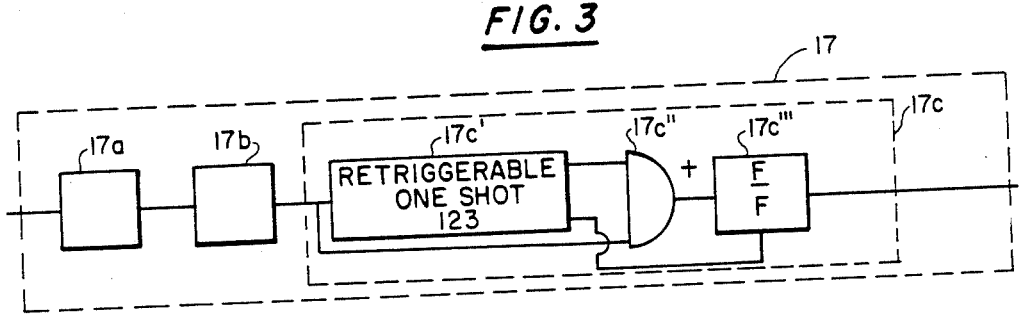
FIG. 4 is a schematic representation of a typical circuit to establish repetitive time bins.

Looking to FIG. 4 the logic circuitry has a one-shot multivibrator 17a that receives the output pulses from the photomultiplier tube. This shapes the signals to have a uniform height and duration for a following counter 17b.

From the counter pulses are fed to the time bin circuit 17c which establishes the time bin duration. A retriggerable one-shot 17c', a 123 integrated circuit has its duration of its output pulse variable so that a first output pulse from counter 17b initiates a pulse from 17c' which is fed to AND gate 17c'' and the gate provides a signal that actuates flip flop 17c''' to deliver an output pulse.

The time bin can be routinely changed by one skilled in the art to accommodate different pulse repetition rates. The use of multiple one-shots with interconnected gates can respond to a variety of bit or no bit coincidences.

Figure 2:
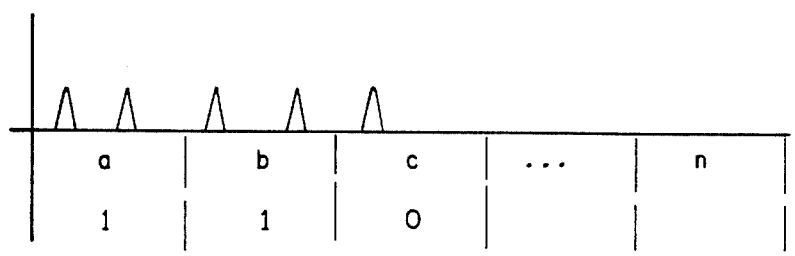
FIG. 2 shows time bin relationships to that indicate the presence or absence of a keyed signal.
Figure 3:
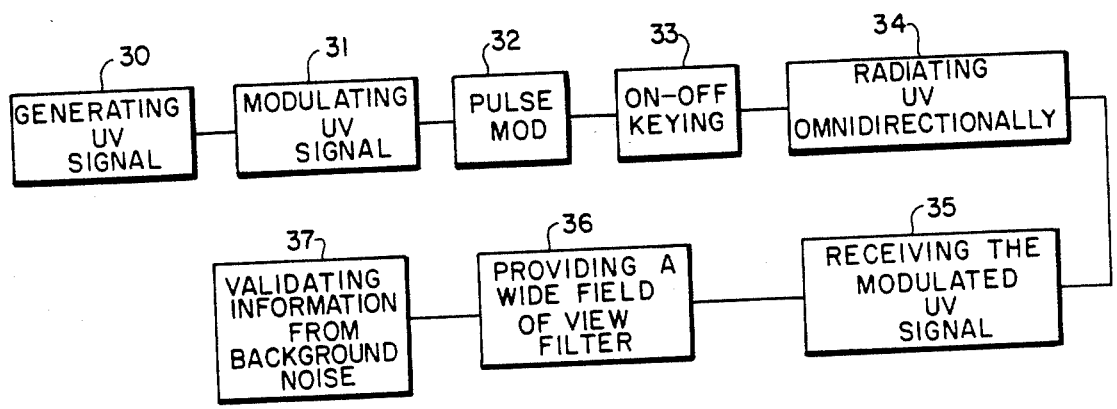
FIG. 3 sets forth the steps of the method of assuring communications in the UV spectrum.

Referring to FIG. 2, the components of logic circuitry 17 are selected to define a number of sequential time bins a,b,c, ... n, that each have a predetermined duration. When two pulses are detected within a time bin, a, a logical 1 is created by the logic circuit. In other words, a 1 output would indicate the occurrence of two ultraviolet pulses received by the photomultiplier tube within a time-bin duration. Similarly, when the second bin, b, embraces two pulses of ultraviolet energy through the communication channel from ultraviolet source 13, another logical 1 would be generated at the output of the logic circuitry. The third data bin, c, shows that only a single bit or single UV is signal received by photomultiplier 16. Since there is no other bit present in time bin c, a logical zero or no output pulse will be shown at the output of the logic circuitry. The single bit that appears in bin c probably is attributed to the nearly insignificant amount of background radiation which is ever present in the "solar blind" region. This has been empirically determined to be approximately 30 photons per second, an insignificant figure in the "solar blind" region.

The duration of the time bin is set according to the components within the logic circuitry and is a function of the pulse repetition rate of the signal emanating from ultraviolet source 13. Since the pulse repetition rate is also a function of the power available and the intended range of the system, the duration of the time bins can ultimately depend on the number of lamps used at the source. A data rate of $10^4$ bits per second is sufficient for the reliable reception of pulsed ultraviolet data at a distance of 0.5 kilometer. This data rate is attained by a single one of the mercury-argon lamps referred to above. Decreasing the data rate to $10^3$ bits per second allowed the reception of meaningful data at a distance of 1.0 kilometers with a single lamp. In each of these cases the data time bin at the receiver would be adjusted (via logic circuitry timing circuits) to accommodate the varying bit rates of data. The higher the bit rate, the smaller the data bin.

The sensitivity of the disclosed UV communication system can be adjusted to sense individual photons. Having a bit equal to at least two photons per unit area at a receiver would make it suitable for communications in the "solar blind" region. A background noise count of 30 photons per second per unit area is in this range so that two photons would be more than enough to be indicated as a transmission of a bit of data as opposed to noise. Using the time bin logic approach outlined above could further assure that even the background count would not overly compromise the validity of the transmitted data in this system.

The scattered phenomenon attributed to the transmission of photons in the UV spectrum guarantees reliable communications when the high power ultraviolet sources are used. Placing a number of these lamps in parallel and simultaneously keying them gives a designer considerable flexibility and a nearly limitless source for omnidirectional radiation.

Figure 5:
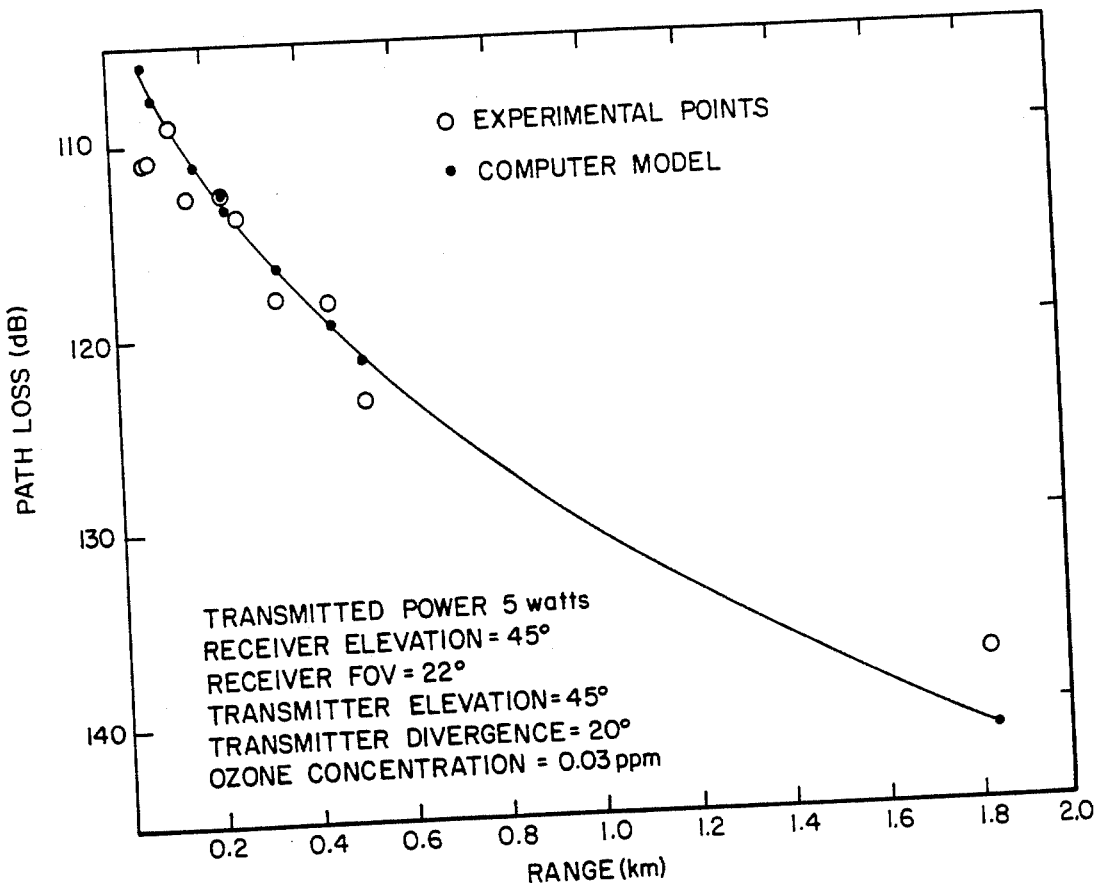
FIG. 5 graphically portrays the propagation loss as a function of range in a non line-of-sight mode operation with a five watt ultraviolet transmission.

In FIG. 5 a curve of values was arrived at that provides an indication of the omnidirectional capability of a five watt transmitted output from an ultraviolet discharge lamp. The receiver filter was located behind buildings and behind hills with respect to the radiating lamp. The path loss with respect to range was computed and marked, with the solid dots while the actual performance was marked by the open circles. It is apparent that the theoretical and actual values are close so that further projections are realistic.

Figure 6:
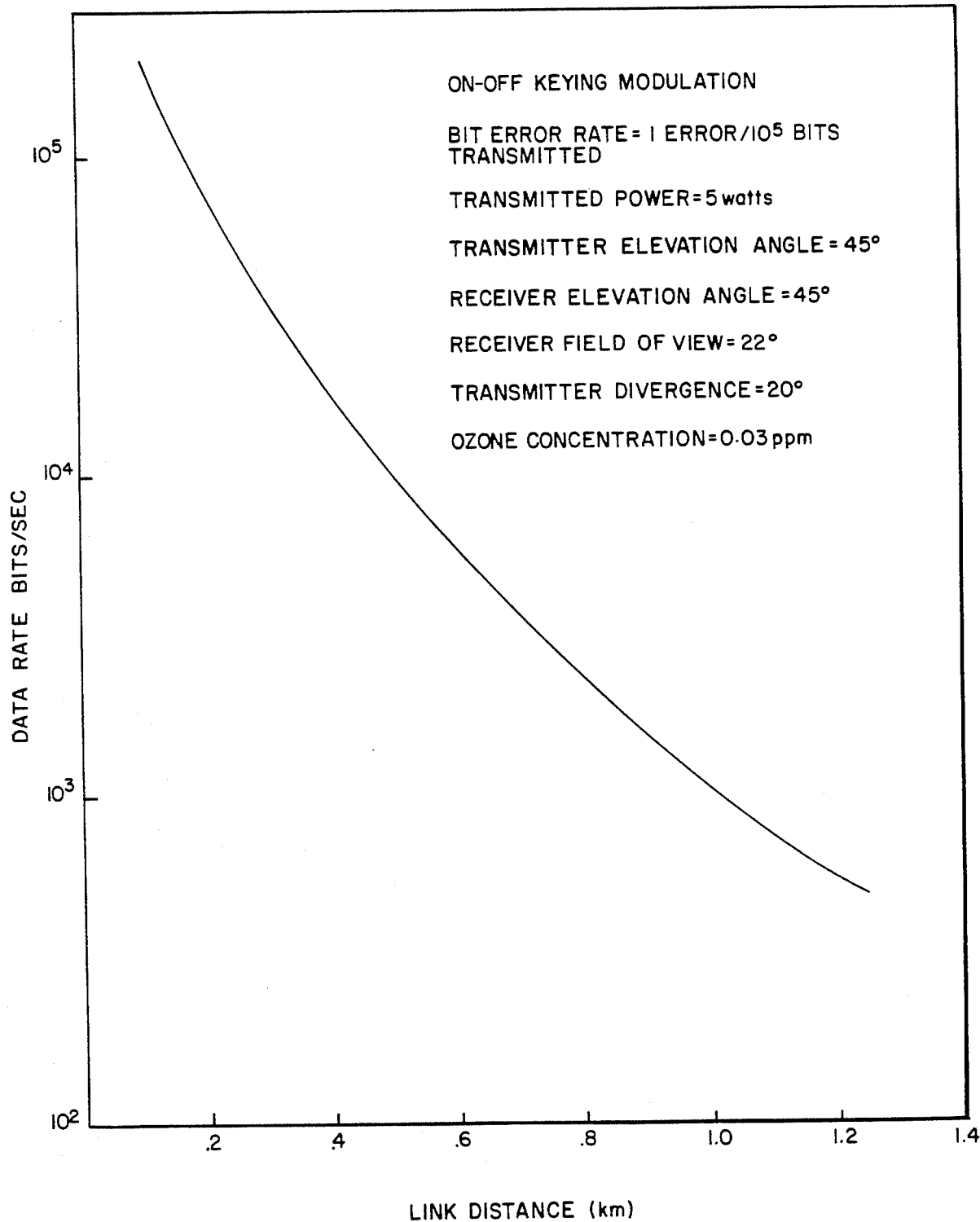
FIG. 6 represents the single bit error rate in a non line-of-sight mode for a five watt ultraviolet transmission as a function of the link distance.

Using Poisson's statistics, the graph of FIG. 6 demonstrates the bit error rate of one bit per $10^5$ bits as a function of link distance separating a wide field-of-view receiver and a five watt transmission from an ultraviolet discharge lamp. It is noted that the on/off keyed modulation sequence for the ranges indicated provide an acceptable bit error rate for reliable communications.

The method of this apparatus includes the generating 30 of an ultraviolet carrier signal in the ultraviolet spectrum. The Hg-Ar discharge lamps referred to above can be actuated singly or in unison to generate a carrier signal in the tens of watts range that is economical and efficient for long term operation.

The modulating 31 of the ultraviolet carrier signal can be by pulse modulating 32 the carrier by on/off keying 33 it to provide pulses of the ultraviolet carrier at a desired pulse repetition rate. The radiating 34 of the modulated ultraviolet carrier in the "solar blind" region is omnidirectional. Because the modulated ultraviolet signal has been generated economically and with few technical complications, power is radiated in the tens of watts range by the Hg-Ar discharge lamps.

Receiving 35 the omnidirectionally radiated modulated ultraviolet carrier by a wide field-of-view filter can be non-line-of-sight and in response to scattered parts of the modulated ultraviolet carrier signal. The providing 36 of a wide field of view filter increases the received signal's strength and enables a validating 37 of information pulses as compared to background noise. The validating of an information signal would be by logic gating the occurrence of two pulses within a time bin as discussed above.

Obviously, many other modifications and variations of the present invention are possible in the light of the above teachings. It is therefore to be understood that within the scope of the appended claims the invention may be practiced otherwise than as specifically described.

What is claimed is:
1. An apparatus for omnidirectionally communicating non-line-of-sight in the ultraviolet spectrum comprising:
   at least one Hg-Ar discharge lamp for generating and omnidirectionally radiating an ultraviolet carrier signal in the two-hundred-thirty to two-hundred-eighty nm spectral range in the tens of watts power range;
   an on/off keying device coupled to the at least one Hg-Ar discharge lamp for modulating the ultraviolet carrier signal in a series of pulses; and
   means remotely disposed from and in a non-line-of-sight relationship to the at least one Hg-Ar discharge lamp for receiving and demodulating scattered parts of the pulse modulated ultraviolet signal, the receiving and demodulating means having a wide field of view to increase the received signal strength.

2. An apparatus according to claim 1 in which the demodulating means includes a "solar blind" filter on a photomultiplier tube and logic circuitry to define a time bin to enable validation from background ultraviolet radiation.

3. An apparatus according to claim 2 in which the logic circuitry is fabricated to provide a valid signal indication whenever at least two pulses of the pulse modulated ultraviolet carrier signal are received with a preset time period defining the duration of a time bin.

4. An apparatus according to claim 3 in which the Hg-Ar discharge lamp has a radiated power of watts to provide an effective omnidirectional transmission range of about one half kilometer at a $10^4$ pulse/sec rate.

5. An apparatus according to claim 3 in which the Hg-Ar discharge lamp has a radiated power of watts to provide an effective omnidirectional transmission of about one kilometer at a $10^3$ pulse/sec rate.

6. An apparatus according to claim 3 in which the logic circuitry includes a first one shot multivibrator that feeds shaped signals representative of pulses of pulse modulated ultraviolet carrier signals to one triggerable one shot responsive to shaped pulses to provide output pulses of selectively variable length to define a time bin, an AND gate coupled to receive the shaped pulses and output pulses and a flip/flop coupled to receive the output pulse along with output signals from the AND gate to provide for the valid signal indication.

7. An apparatus according to claim 6 in which the demodulation means is responsive to two photons per unit area for indicating a data bit to make it responsive to data bits in background noise of about 30 photons per second per unit area.

8. A method of communicating in the ultraviolet spectrum comprising:
   generating an ultraviolet signal in the "solar blind" region in the tens of watts power range;
   modulating the ultraviolet signal;
   radiating the modulated ultraviolet signal omnidirectionally;
   receiving the radiated modulated ultraviolet signal at a non-line-of-sight location anywhere within the range of the omnidirectionally radiated modulated ultraviolet signal; and
   demodulating the received ultraviolet signal.

9. A method according to claim 8 in which the modulating is the pulse modulating and the receiving is the receiving of scattered parts of the ultraviolet signal.

10. A method according to claim 9 in which the generating is the operation of at least one Hg-Ar discharge lamp.

11. A method according to claim 10 in which the receiving includes the providing of a wide angle filter responsive to pass modulated ultraviolet signals in the "solar blind" region to increase the received signal strength and the further providing of a photomultiplier tube responsive to the "solar blind" region.

12. A method according to claim 11 in which the demodulating includes the validating of a pulse modulated signal from background radiation in the "solar blind" region by determining the receipt of two pulses within a preset reoccurring time period at the receiver.

13. A method according to claim 12 in which the demodulation includes being response to pulse modulated signals having a signal strength of about two photons per pulse in the "solar blind" region.

* * * * *